(12) United States Patent
Sabin et al.

(10) Patent No.: US 9,454,406 B2
(45) Date of Patent: Sep. 27, 2016

(54) TECHNIQUES FOR CLOUD BURSTING

(75) Inventors: Jason Allen Sabin, Lehi, UT (US); Stephen R Carter, Spanish Fork, UT (US); Michael John Jorgensen, Mapleton, UT (US); Nathaniel Brent Kranendonk, Springville, UT (US); Kal A. Larsen, Springville, UT (US); Jeremy Ray Brown, Orem, UT (US)

(73) Assignee: Novell, Inc., Provo, UT (US)

( * ) Notice: Subject to any disclaimer, the term of this patent is extended or adjusted under 35 U.S.C. 154(b) by 507 days.

(21) Appl. No.: 13/036,854

(22) Filed: Feb. 28, 2011

(65) Prior Publication Data
US 2012/0222041 A1    Aug. 30, 2012

(51) Int. Cl.
G06F 15/173    (2006.01)
G06F 9/50    (2006.01)
H04L 29/08    (2006.01)

(52) U.S. Cl.
CPC ......... G06F 9/5083 (2013.01); H04L 67/1008 (2013.01); G06F 9/5072 (2013.01); G06F 2209/5022 (2013.01); H04L 67/1097 (2013.01)

(58) Field of Classification Search
CPC ........... H04L 67/1002; H04L 67/1008; H04L 29/06; H04L 63/0428; H04L 63/166; H04L 67/1012; H04L 67/10; H04L 47/125; H04L 41/12; H04L 41/509; H04L 43/10; H04L 67/16; H04L 43/08; H04L 47/70; G06F 9/5055; G06F 12/0808; G06F 15/173; G06F 15/177; G06F 2201/815; G06F 11/1484

USPC .................................................. 718/104, 105
See application file for complete search history.

(56) References Cited

U.S. PATENT DOCUMENTS

| | | | |
|---|---|---|---|
| 2008/0080526 A1 | 4/2008 | Gounares et al. | |
| 2008/0243634 A1* | 10/2008 | Dworkin et al. | 705/26 |
| 2009/0300210 A1 | 12/2009 | Ferris | |
| 2010/0050172 A1 | 2/2010 | Ferris | |
| 2010/0217850 A1 | 8/2010 | Ferris | |
| 2010/0223378 A1* | 9/2010 | Wei | 709/224 |
| 2010/0287263 A1* | 11/2010 | Liu et al. | 709/221 |
| 2011/0209146 A1* | 8/2011 | Box et al. | 718/1 |
| 2011/0277027 A1* | 11/2011 | Hayton et al. | 726/8 |
| 2012/0060165 A1* | 3/2012 | Clarke | 718/104 |
| 2012/0096149 A1* | 4/2012 | Sunkara et al. | 709/224 |

* cited by examiner

*Primary Examiner* — Brian J Gillis
*Assistant Examiner* — Thao Duong
(74) *Attorney, Agent, or Firm* — Schwegman Lundberg & Woessner, P.A.

(57) ABSTRACT

Techniques for automated and controlled cloud migration or bursting are provided. A schema for a first cloud in a first cloud processing environment is used to evaluate metrics against thresholds defined in the schema. When a threshold is reached other metrics for other clouds in second cloud processing environments are evaluated and a second cloud processing environment is selected. Next, a second cloud is cloned in the selected second cloud processing environment for the first cloud and traffic associated with the first cloud is automatically migrated to the cloned second cloud.

16 Claims, 4 Drawing Sheets

TECHNIQUES FOR CLOUD BURSTING

BACKGROUND

Cloud computing is rapidly changing the Internet into a collection of clouds, which provide a variety of computing resources, storage resources, and, in the future, a variety of resources that are currently unimagined. This new level of virtualization should have unbounded the physical and geographical limitations of traditional computing, but this is not yet the case.

Even with existing virtualization capabilities, businesses are faced with scaling, migration, and expense issues for their resources that operate in these cloud environments. That is, to achieve proper managed and controlled access to physical resources of these cloud environments, businesses have to manually manage and often manually schedule/plan for migrating from a loaded cloud environment to other less loaded and sometimes more affordable cloud environments.

Stated another way, a business environment is dynamic, chaotic, and ever changing so if a particular cloud environment becomes problematic, for any of a variety of reasons, there is not an efficient, controlled, and automated way to migrate to other more desirable cloud environments.

For example, business applications may need to scale over time (or even unexpectedly) to extremely large solutions where those large solutions simply cannot be handled by the business's current virtualization infrastructure. Currently, if there is a spike or burst of a massive amount of traffic, which taxes the current infrastructure, there is no ability to massively scale to other clouds intelligently in a planned, controlled, and automated manner.

SUMMARY

Various embodiments of the invention provide techniques for intelligent cloud bursting. Specifically, a method for cloud bursting is presented.

A schema is acquired that defines model metrics for an automated service; the automated service processed as a first cloud of a cloud network. Next, a workflow process is initiated based on processing metrics for the first cloud, the processing metrics exceed a threshold defined in the model metrics. Then, second metrics are gathered for cloud processing environments of the cloud network and a particular cloud processing environment is selected based on evaluation of the second metrics. The first cloud is cloned as a second cloud within the particular cloud processing environment and traffic for the first cloud is automatically migrated to the second cloud.

DETAILED DESCRIPTION

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a cloud, a hardware device, an agent, and/or an application.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

"Burst" or "bursting" refers to migrating and deploying a VM as a new instance of an independent cloud having one or more services (resources) operating within that cloud, and the cloud operates within a network of other available clouds.

An "agreement" refers to a data structure that embodies contractual obligations of an enterprise, which can be translated into processing that is then interpreted and enforced. A Service Level Agreement (SLA) is one such type of agreement, a software license is another, others can exist as well.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

Embodiments and components of the invention are implemented and reside in a non-transitory computer-readable medium that executes on one or more processors that are specifically configured to process the embodiments and components described herein and below.

Figure 1:
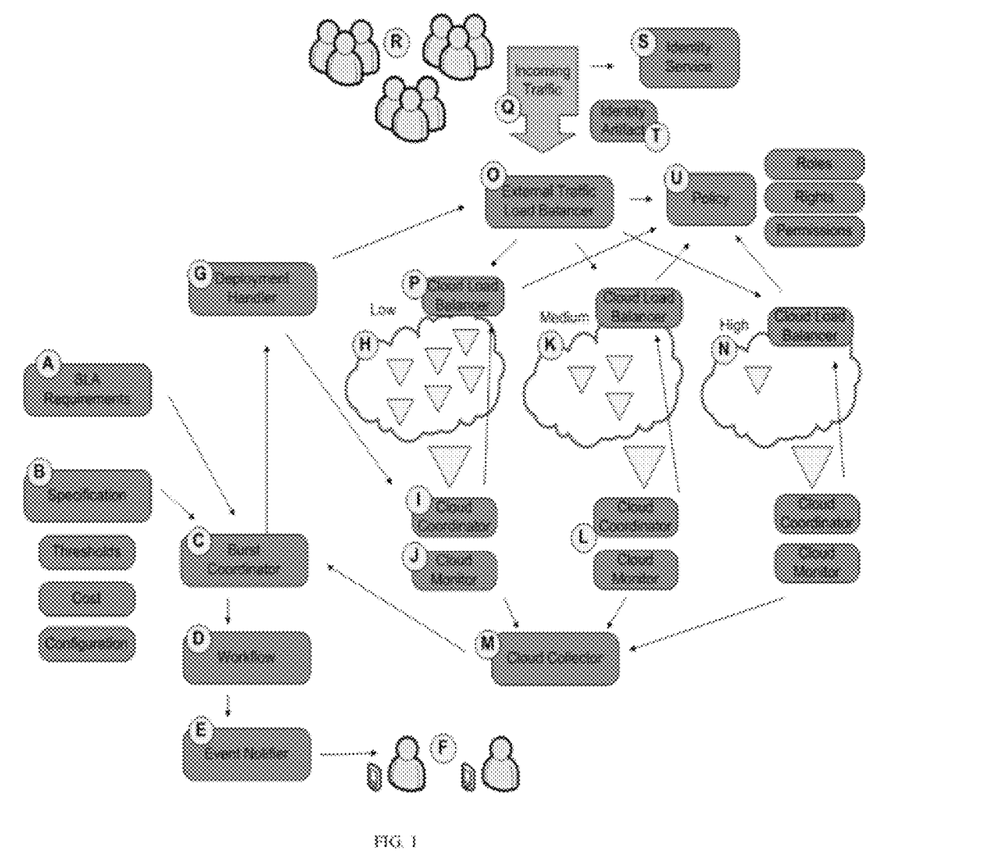
FIG. 1 is a diagram of an example architecture for intelligent cloud bursting, according to the techniques presented herein.

FIG. 1 is a diagram of an example architecture for intelligent cloud bursting, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a variety of specific example situations that an enterprise utilizing cloud environments can encounter. These are presented for purposes of illustration only as other situations can occur as well and still benefit from the techniques presented herein and below.

Consider that an enterprise's customers have a Service Level Agreement (SLA) with the enterprise that defines the requirements for maintaining or handling a specific service used by customers and offered by the enterprise. This SLA is mapped to specific requirements (A). From these requirements a specification (B) is made. This specification includes what thresholds, costs, and configuration are needed to maintain the SLA (A). An example threshold may be when the current internal infrastructure hits 70% Central Processing Unit (CPU) usage then there is a need to expand. Another example may be when the current infrastructure hits 50 requests per second then there is a need to expand. The cost identifies what costs are permissible. For example, if the service hits 50 requests per second, then it is permissible to expand and allow an additional $100 per hour. The configuration information identifies what the specific values are for the thresholds and costs. This configuration also identifies the automated processing instructions for expanding the existing infrastructure to handle any needs associated with cloud bursting. For example, this processing may be for an Identity Server configuration, which handles requests per second for the enterprise website.

The information is handled by the Burst Coordinator (C). So, the Burst Coordinator is notified when a particular threshold has been hit. For example, the service's requests per second have now exceeded 50 requests per second on the Identity Server Configuration. This then enacts a workflow process to determine what needs to occur for this situation. The workflow can determine that administrators need to be notified or asked for approval. The event notification (E) notifies and possibly waits for Administrator approval (F), depending on the workflow. In this example, the administrators just need to be informed of the bursting decision. The Burst Coordinator (C) then contacts the Deployment Handler (G) and informs the Deployment Handler of the need to burst and add additional Identity Servers. The allowed cost may be set at $100 per hour. The Deployment Handler can look at various private and public clouds and determine what the associated costs of each are. The Deployment Handler has selected a low cost private cloud at H. The Deployment Handler (G) then contacts the local Cloud Coordinator (I) to inform it that it has been selected for deployment. A Cloud Coordinator (I) can be cloned to handle the specific requests within this cloud. The cloud coordinator determines how many virtual machines (VMs) and Identity Server Configurations that have to be cloned for purposes of handling the burst of traffic. There is also a Cloud Monitor (J), which monitors and calculates the VMs' thresholds within this cloud and returns this information either to a Cloud Collector or directly to the Burst Coordinator.

Once the Cloud Coordinator has cloned and expanded the bursting capabilities it responds back to the Deployment Handler that the expansion has occurred and is finished. The Cloud Coordinator then contacts the External Traffic Load Balancer (O) to indicate that additional resources have been added. The External Traffic Load Balance allows the capability to cascade load balancing between various clouds to the local Cloud Load Balancer (P). The Deployment Handler notifies the Traffic Load Balancer, who then can be dynamically and automatically re-configured to point to the new cloud load balancer.

As the Cloud Coordinator (I) notices that new VMs are ready to go and to be added, it will notify its local Cloud Load Balancer (Item P) that new Internet Protocol (IP) addresses can be added into the load balancing decisions going forward. The Cloud Load Balancer adds these new VMs and starts sending traffic to the new VMs. Having the external load balancer(s) cascading to load balancers in each cloud also allows for automated controlling of the traffic patterns: segment by region, segment by network, etc.

If the Identity Server's number of requests per second continues to increase and hit the next threshold of 100 requests per second. Then an allowed cost of $200 per hour may be needed. This processing situation again goes through the Burst Coordinator, handle any workflow decisions, and notify all administrators of the next burst and of the additional expenses. The Deployment Handler can either increase the VM instances in Cloud H if there is capacity or it could select the next medium priced cloud at K. This has its own Cloud Coordinator and Cloud Monitor (L). This cloud may be a public cloud. Once two clouds are being bursting to, a Cloud Collector (M) is used for handling the multiple clouds. Additionally, the Traffic Load Balancer (O) is automatically re-configured to point to the additional resources and to load balance between all the resources within the multiple clouds.

If the Identity Server's number of requests per second is to suddenly spike up to 500 requests per second, numerous thresholds have been reached and warnings that may be associated with either having a large spike in traffic (e.g., Black Friday on the Stock Market) or a Denial of Service attack. The workflow then may notify multiple people including executives of the company. A decision may then be made to either expand out to all possible clouds (N) no matter the price or to halt the bursting and determine if there is some problem or attack.

Once the spike of traffic has been handled and there is no longer a need to have this massive scalability, resources that are no longer needed can be removed or deleted. Removal can start with the most-expensive cloud (and working back from there) along with processing to contact the local Cloud Coordinator that processing for de-provisioning resources has started. Once the appropriate machines are labeled for removal, the Cloud Coordinator contacts the local cloud load balancer and removes the VM IP addresses that are tasked for removal and de-provisioning. If an entire cloud has been emptied of resources, the Cloud Coordinator notifies the Deployment Handler that this cloud is no longer used. The Deployment Handler notifies the External Traffic Load Balancer to remove that cloud's load balancer IP address. This process can continue until the enterprise is back to its original local resources in the low cost cloud.

In another enhanced scenario, the bursting and balancing can occur based on identity-specific policy.

For example, load balancing can be established via identity where the first access contains the identity artifact, which allows the load balancer to look up roles/rights/permissions and load balance to appropriate infrastructure as per policy (e.g., 10 Gigabit (GB) links may not be available to certain customers). This is demonstrated by the Incoming Traffic (Q) that is coming into the External Traffic Load Balancer (O). Each segment of users (R) can be authenticated to an Identity Service (S), as the users are authenticated and an Identity artifact (T) is attached. When the incoming traffic hits the External Traffic Load Balancer it can perform a Policy decision (U). This Policy decision can be used to evaluate Roles, Rights, and Permissions. This can include the Quality of Service (QoS) the user/s have and can isolate those users to a specific Cloud infrastructure.

Optionally the individual Cloud Load Balancers (P) can also perform policy decisions, if there are individual VMs within its own cloud, which may have various rates or QoS's.

For example, an intern may be working for Company 1; the intern has his/her identity validated at the Identity Service and then proceeds to access the workload service. He/she may have a lower QoS and as such is pushed to the low cost cloud, which may have slower bandwidth, slower resources, but does not have a high cost. While the Chief Executive Officer (CEO) has the fastest resources available because he/she has a higher QoS based off of the Policy decisions that were performed at each of the load balancers.

The techniques herein describe how enterprises can burst into massive scalability and maintain their SLAs with customers. This is achieved via intelligent specifications and thresholds for purposes of expanding and contracting out to and in from various cloud computing infrastructures in an automated and controlled fashion and in accordance with enterprise policy and security.

Figure 2:
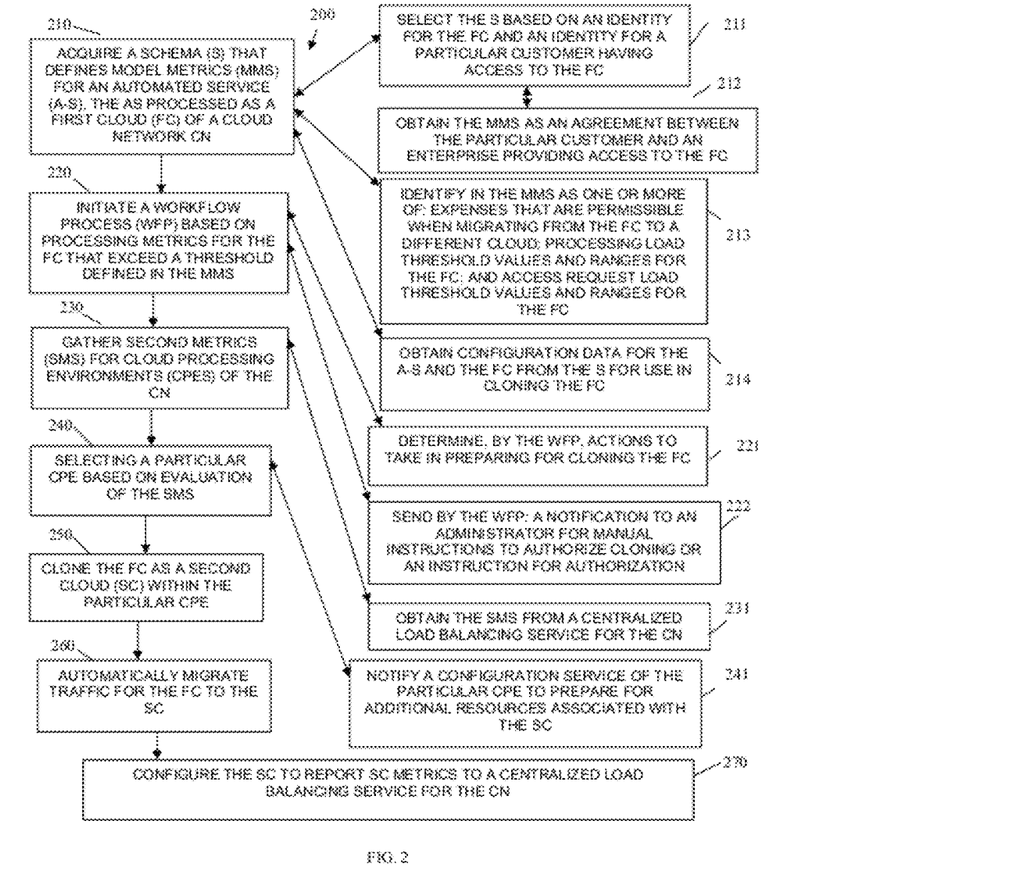
FIG. 2 is a diagram of a method for cloud bursting, according to an example embodiment.

FIG. 2 is a diagram of a method 200 for cloud bursting, according to an example embodiment. The method 200 (hereinafter "cloud burst manager") is implemented and resides within a non-transitory computer-readable or processor-readable medium that executes on one or more processors of a network. Moreover, the cloud burst manager is operational over a network and the network may be wired, wireless, or a combination of wired and wireless.

At 210, the cloud burst manager acquires a schema that defines model metrics for an automated service. The automated service processed as a first cloud of a cloud network. The cloud network includes a variety of cloud processing environments and each cloud processing environment including a plurality of clouds.

Model metrics include a variety of values for: the first cloud's processing load, memory usage, storage availability, request processing load, vendor expenses for using resources within the first cloud, and the like.

According to an embodiment, at 211, the cloud burst manager selects the schema based on an identity for the first cloud and an identity for a particular customer having access to the first cloud. The customer may be viewed as a principal, such that it may be a user or an automated application processing on behalf of or under the direction of the user.

Continuing with the embodiment of 211 and at 212, the cloud burst manager obtains the model metrics as an agreement (such as an SLA, software license, and others) between the particular customer and an enterprise that provides access to the first cloud. The agreement can be pursuant to or define a licensing agreement between the enterprise and the customer.

In another case, at 213, the cloud burst manager identifies the model metrics as one or more of: expenses that are permissible when migrating from the first cloud to a different cloud associated with a different cloud processing environment from that which was associated with the first cloud, processing load threshold values and/or ranges for the first cloud, and access request load threshold values and/or ranges for the first cloud.

In yet another scenario, at 214, the cloud burst manager obtains configuration data for the automated service and the first cloud from the schema for using in cloning the first cloud. It may be the case that the schema provides a reference to link for obtaining the configuration information or includes an identifier for the automated service and/or the first cloud that can be used to consult another service that supplies the configuration data.

At 220, the cloud burst manager initiates a workflow process based on processing metrics for the first cloud that exceed a predefined threshold defined in the model metrics. For example, the level of service in terms of request load processing, memory usage, processor usage, storage usage, and/or the like for the first cloud can exceed a predefined threshold value for one, some, or all of these things. This situation triggers the cloud burst manager to initiate a workflow process, which may also be defined in the schema.

According to an embodiment, at 221, the cloud burst manager determines, via the workflow process, specific actions to take in preparing for the cloning of the first cloud. A variety of automated actions can be taken by the workflow process in preparing for cloning the first cloud.

For example, at 222, the cloud burst manager sends, via the workflow process, a notification to an administrator for manual instructions or approval to authorize the cloning of the first cloud. In other words, the workflow process can cause the cloud burst manager to idle or wait until an authorization required by one or more actions defined in the workflow process is received. The authorization can be dependent on predefined events and/or other processing as well and can be obtained via automated processing when those events and/or processing successfully complete. So, in another case of 222, a notification is sent to another automated process for authorization to clone the first cloud.

At 230, the cloud burst manager gathers second metrics for cloud processing environments of the cloud network. These second metrics identify processing load, memory usage, storage availability and/or vendor expenses for using services of a particular cloud processing environment. These second metrics are used in combination with the model metrics defined in the schema in dynamically and in real time selecting a particular second cloud processing environment where the first cloud is to be cloned.

In an embodiment, at 231, the cloud burst manager obtains the second metrics from a centralized load balancing service used for the cloud network. This was identified and discussed above with reference to the FIG. 1, item O. Each separate cloud processing environment may have its own cloud processing environment load balance (P in the FIG. 1), which report to the centralized load balancing service (again O in the FIG. 1).

At 240, the cloud burst manager clones the first cloud as a second cloud within the particular cloud processing environment. This entails using the configuration data to correctly configure and instantiate the second cloud in the particular cloud processing environment and ensuring the proper policy and security is configured and enforced within the second cloud as it was in the original first cloud.

It is noted that the first cloud may continue processing within its original cloud processing environment but new traffic is migrated away from the first cloud and diverted to the second cloud. So, scheduled processes that have not yet executed may continue to process in the first cloud, if this is desired and/or if processing conditions (obtained via processing metrics) improve after the new traffic is migrated away from the first cloud to the second cloud.

According to an embodiment, at 241, the cloud burst manager notifies a configuration service of the particular cloud processing environment to prepare for additional resources associated with the second cloud. This can entail assuring the appropriate resources and response times for those resources are configured and available to the second cloud once it is up and running.

At 250, the cloud burst manager clones the first cloud as a second cloud within the particular cloud processing environment. That is, the cloud processing environment associated with the first cloud is different from the particular cloud processing environment of the second cloud. The first cloud has now been cloned in an automated manner based on changing conditions within the first cloud's processing environment, within the first cloud, and within the overall cloud network. Determination of when conditions warrant the switch over to the cloned second cloud was discussed above and is defined in the schema.

Finally, at 260, the cloud burst manager automatically and dynamically migrates traffic for the first cloud over to the second cloud for processing. This migration is transparent to the principals, customers, and other services that are using the first cloud and comply with SLA's customers have with an enterprise offering the first cloud.

In an embodiment, at 270, the cloud burst manager configures the second cloud to report second cloud metrics to a centralized load balancing service for the cloud network. This ensures that should conditions warrant in the second cloud, the second cloud may be again cloned to yet another cloud processing environment as a third cloud, of the second cloud may be de-provisioned and traffic rolled back into the first cloud (based on conditions in the first cloud and the first cloud's processing environment).

The techniques presented are dynamic and achieved automatically to ensure that processing in clouds receive an agreed level of service or QoS from the perspective of the principals (customers, users, or even automated applications). Some factors used in the evaluation of the metrics can include expenses associated with providing a specific QoS, as discussed above in detail with reference to the FIG. 1.

Figure 3:
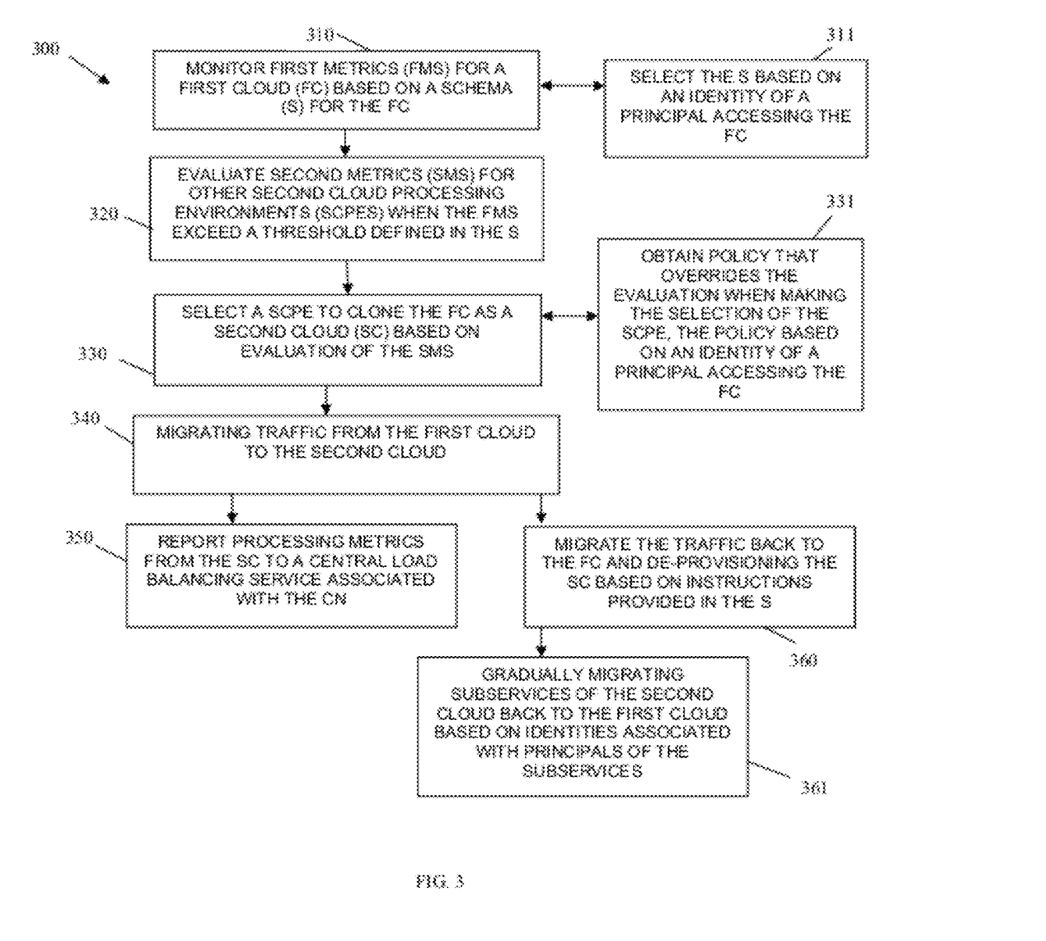
FIG. 3 is a diagram of another method for cloud bursting, according to an example embodiment.

FIG. 3 is a diagram of another method 300 for cloud bursting, according to an example embodiment. The method 300 (hereinafter "cloud migration service") is implemented and resides within a non-transitory computer-readable or processor-readable medium that executes on one or more processors of a network. Moreover, the cloud migration service is operational over a network and the network may be wired, wireless, or a combination of wired and wireless.

The cloud migration service presents another and in some cases enhanced perspective of the cloud burst manager represented by the method 200 of the FIG. 2 and discussed in detail above.

At 310, the cloud migration service monitors first metrics from a first cloud based on a schema for the first cloud. The schema defines processing, memory, response time, storage, and/or expense metric threshold values. The cloud migration service monitors the first metrics in real time and dynamically as resources are handled within the first cloud. The first cloud processing within a first cloud processing environment, so some of the first metrics can be associated with the first cloud processing environment as well, especially when in these situations the metrics from the first cloud processing environment effect processing response times of the first cloud and its resources.

According to an embodiment, at 311, the cloud migration service selects the schema based on an identity of a principal accessing the first cloud. For example, a schema for support staff that needs to access resources of the first cloud may have different threshold values or requirements that than which is associated with a CEO of an enterprise. Moreover, a schema for a customer having a SLA with the enterprise may have different contractual threshold values from that which is associated with an employee of the enterprise that accesses the first cloud's resources.

At 320, the cloud migration service evaluates second metrics for other second cloud processing environments when the first metrics exceed a threshold defined in the schema. So, the first metrics are gathered dynamically for the first cloud and the first cloud processing environment and when threshold values defined in the schema are exceeded, the second metrics are evaluated for purposes of finding a suitable second cloud processing environment where the first cloud can be cloned as a second cloud.

At 330, the cloud migration service selects a second cloud processing environment to clone the first cloud as a second cloud based on evaluation of the second metrics.

In an embodiment, at 331, the cloud migration service obtains policy that overrides the evaluation when making the selection of the second cloud processing environment. The policy is based on an identity of a principal accessing the first cloud. So, a more expensive target cloud may be disallowed by policy for a typically employee of an enterprise whereas it is permitted and desired for the CEO of the enterprise.

At 340, the cloud migration service migrates traffic from the first cloud to the second cloud. In some cases, only selective identified traffic is migrated away from the first cloud to the cloned second cloud. In other cases, all traffic is migrated away from the first cloud to the cloned second cloud.

In an embodiment, at 350, the cloud migration service reports processing metrics from the second cloud to a central load balancing service associated with the cloud network. This situation was discussed at length above with reference to the FIGS. 1 and 2. This permits the entire cloud network to be continuously and dynamically inspected and altered as needed based on changing conditions.

In another situation, at 360, the cloud migration service migrates the traffic back to the first cloud and de-provisions the second cloud based on instructions provided in the schema. So, when conditions improve on the first cloud, the schema may dictate that the second cloud and its processing are folded back into the first cloud. In this way, any additional expenses associated with the second cloud and its provider can be mitigated and eliminated once the second cloud is no longer in need.

Continuing with the embodiment of 360 and at 361, the cloud migration service gradually migrates subservices of the second cloud and traffic associated with those subservices back to the first cloud based on identities associated with principals using those subservices. Thus, the migration back to the first cloud can be gradual or in a piecemeal fashion and can be identity based.

Figure 4:
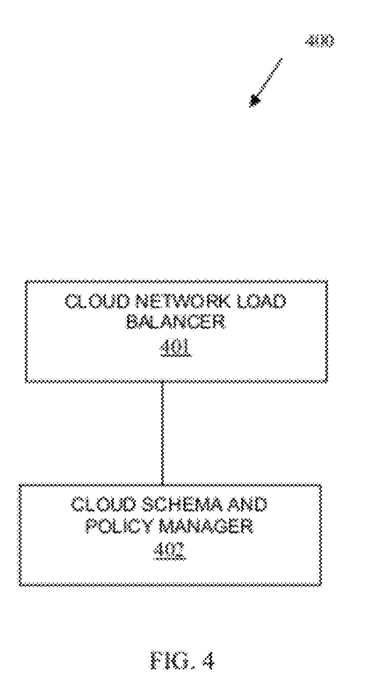
FIG. 4 is a diagram of a cloud bursting system, according to the techniques presented herein.

FIG. 4 is a diagram of a cloud bursting system 400, according to the techniques presented herein. The components of the cloud bursting system 400 are implemented within and reside within a non-transitory and computer or processor-readable storage medium for purposes of executing on one or more processors of a network. The network may be wired, wireless, or a combination of wired and wireless.

The cloud bursting system 400 implements, inter alia, various aspects of the FIG. 1, and the method 200 and the method 300 of the FIGS. 2 and 3, respectively.

The cloud bursting system 400 includes a cloud network load balancer 401 and a cloud schema and policy manager 402. Each of these components and their interactions with one another will now be discussed in detail.

The cloud network load balancer 401 is implemented in a non-transitory computer-readable storage medium and executes on one or more processors of a network. Example aspects of the cloud network load balancer 401 were discussed above with reference to the FIGS. 1-3.

The cloud network load balancer 401 is configured to gather metrics from cloud processing environments of a cloud network. Each cloud processing environment includes a plurality of independent clouds. The cloud network load balancer 401 reports or makes the metrics available to the cloud schema and policy manager 402. Some example types of metrics were presented above with reference to the FIGS. 1-3.

The cloud schema and policy manager 402 is implemented in a non-transitory and computer-readable storage medium and executes on one or more processors of a network. The processors are specifically configured to execute the cloud schema and policy manager 402. Example processing associated with the cloud schema and policy manager 402 was presented above in detail with reference to the FIGS. 1-3.

The cloud schema and policy manager 402 is configured to enforce threshold values in a specific schema for metrics based on a cloud identity for a particular cloud. When the threshold values are exceeded, the cloud schema and policy manager 402 is configured to migrate traffic from the particular cloud to a second cloud for the first cloud in another cloud processing environment for processing by consulting the specific schema and the cloud load balancer 401.

According to an embodiment, the cloud schema and policy manager 402 is configured to use a policy based on a principal identity for a principal using the particular cloud to assist in selecting the second clone cloud.

In another case, the cloud schema and policy manager 402 is configured to initiate a workflow process to take a plurality of actions in migrating the traffic to the second cloned cloud. This was discussed in detail above with reference to the FIGS. 1-3.

In yet another situation, the cloud schema and policy manager 402 is configured to consider expenses associated with the second cloned cloud based on predefined permissible expenses defined in the specific schema before selecting the second clone cloud.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

acquiring a schema that defines model metrics for an automated service and configuration information, the automated service processed as a first cloud of a cloud network, the metrics define: processing loads for the first cloud, access requests for the first cloud, costs; the configuration information includes threshold values for the metrics, and the configuration information defines automated processing instructions for expanding an existing infrastructure for the first cloud to burst to a new cloud when thresholds are met and based on the metrics;

initiating a workflow process based on processing metrics for the first cloud that exceed a threshold defined in the model metrics;

gathering second metrics for cloud processing environments of the cloud network;

selecting a particular cloud processing environment based on evaluation of the second metrics, wherein selecting further includes evaluating the cloud processing environments from public clouds and private clouds, wherein selecting further includes obtaining policy that overrides the evaluation when making selection of the particular cloud processing environment, the policy based on an identity of a principal accessing the first cloud, wherein a principal is one of: a particular automated service and a user;

cloning, by a cloud coordinator, the first cloud as a second cloud within the particular cloud processing environment;

automatically migrating traffic for the first cloud to the second cloud; and de-provisioning processing of the traffic from the second cloud back to the first cloud when added resources from the second cloud are no longer needed to handle the traffic for the first cloud based on conditions of the first cloud.

2. The method of claim 1, wherein acquiring further includes selecting the schema based on an identity for the first cloud and an identity for a particular customer having access to the first cloud.

3. The method of claim 2, wherein acquiring further includes obtaining the model metrics as an agreement between the particular customer and an enterprise providing access to the first cloud.

4. The method of claim 1, wherein initiating further includes determining, by the work flow process, actions to take in preparing for cloning the first cloud.

5. The method of claim 1, wherein initiating further includes, sending, by the work flow process: a notification to an administrator for manual instructions to authorize cloning the first cloud or an instruction to another automated process for authorization to clone the first cloud.

6. The method of claim 1, wherein gathering further includes obtaining the second metrics from a centralized load balancing service for the cloud network.

7. The method of claim 1, wherein selecting further includes notifying a configuration service of the particular cloud processing environment to prepare for additional resources associated with the second cloud.

8. The method of claim 1 further comprising, configuring the second cloud to report second cloud metrics to a centralized load balancing service for the cloud network.

9. A method implemented in a non-transitory machine-readable storage medium and processed by one or more processors configured to perform the method, comprising:
monitoring first metrics having configuration information for a first cloud based on a schema for the first cloud the first metrics define: processing loads for the first cloud, access requests for the first cloud, costs; the configuration information includes threshold values for the first metrics, and the configuration information defines automated processing instructions for expanding an existing infrastructure for the first cloud to burst to a new cloud when thresholds are met and based on the first metrics;
evaluating second metrics for other second cloud processing environments when the first metrics exceed particular threshold values defined in the schema;
selecting a second cloud processing environment to clone the first cloud as a second cloud based on evaluation of the second metrics, wherein selecting further includes evaluating the second cloud processing environments from public clouds and private clouds, wherein selecting further includes obtaining policy that overrides the evaluation when making the selection of the second cloud processing environment, the policy based on an identity of a principal accessing the first cloud, and wherein the principal is one of: a particular automated service and a user;
migrating traffic from the first cloud to the second cloud; and
de-provisioning processing of the traffic from the second cloud processing environment back to the first cloud processing environment when added resources from the second cloud processing environment are no longer needed to handle the traffic for the first cloud processing environment based on conditions of the first cloud processing environment.

10. The method of claim 9, wherein monitoring further includes selecting the schema based on an identity of a principal accessing the first cloud.

11. The method of claim 9 further comprising, reporting processing metrics from the second cloud to a central load balancing service associated with the cloud network.

12. The method of claim 9 further comprising, migrating the traffic back to the first cloud and de-provisioning the second cloud based on instructions provided in the schema.

13. The method of claim 12, wherein migrating further includes migrating subservices of the second cloud back to the first cloud based on identities associated with principals of the subservices.

14. A system, comprising:
a cloud network load balancer implemented in a non-transitory computer-readable storage medium and to execute on one or more processors of a network;
a cloud schema and policy manager implemented in a non-transitory computer-readable storage medium and to execute on one or more processors of the network;
the cloud network load balancer configured to gather metrics from cloud processing environments, each cloud processing environment having a plurality of clouds, the cloud network load balancer reports or makes the metrics available to the cloud schema and policy manager, the cloud schema and policy manager configured to enforce threshold values in a specific schema for the metrics based on a cloud identity for a particular cloud and when threshold values are exceeded, the cloud schema and policy manager configured to migrate traffic for the particular cloud to a second cloned cloud for the first cloud in another cloud processing environment for processing by consulting the specific schema and the cloud network load balancer and wherein the second cloned cloud is de-provisioned back to the first cloud when added resources from the second cloned cloud are no longer needed to handle traffic associated with the first cloud based on conditions of the first cloud, each specific schema defines a specific set of metrics and specific configuration information, each specific set of metrics define: processing loads for a specific cloud, access requests for the specific cloud, costs for the specific cloud; and the configuration information includes specific threshold values for the specific cloud, and the configuration information defines automated processing instructions for expanding an existing infrastructure for the first cloud to burst to a new cloud when thresholds are met and based on each specific set of the metrics, wherein the cloud schema and policy manager is configured to use a policy based on a principal identity for a principal that uses the particular cloud to assist in selecting the second cloned cloud from public and private clouds, and wherein a second policy is obtained that overrides selection of the second cloned cloud based on a second principal identity of a second principal who is accessing the first cloud, wherein the principal is one of: a first automated service and a first user, and wherein the second principal is one of: a second automated service and a second user.

15. The system of claim 14, wherein the schema and policy manager is configured to initiate a workflow process to take a plurality of actions in migrating the traffic to the second cloned cloud.

16. The system of claim 14, wherein the cloud schema and policy manager is configured to consider expenses associated with the second cloned cloud based on predefined permissible expenses defined in the specific schema before selecting the second cloned cloud.

* * * * *